Oct. 17, 1967 F. G. LEE ET AL 3,348,160

ISOLATOR NETWORK FOR PROVIDING A PLURALITY OF OUTPUT SIGNALS
FROM A SINGLE SIGNAL SOURCE

Filed Nov. 19, 1964

WITNESSES:

Bernard R. Gieguey

James F. Young

INVENTORS
Franklin G. Lee &
Harold A. Male.

BY Ernest P. Klipfel
ATTORNEY

United States Patent Office 3,348,160
Patented Oct. 17, 1967

3,348,160

ISOLATOR NETWORK FOR PROVIDING A PLURALITY OF OUTPUT SIGNALS FROM A SINGLE SIGNAL SOURCE

Franklin G. Lee, Baltimore, and Harold A. Male, Glen Burnie, Md., assignors to Westinghouse Electric Corporation, Pittsburgh, Pa., a corporation of Pennsylvania Filed Nov. 19, 1964, Ser. No. 412,369
6 Claims. (Cl. 330—15)

ABSTRACT OF THE DISCLOSURE

An isolator network for providing a plurality of output signals from a single signal source comprising a push-pull emitter follower circuit driven from a single signal source which feeds a plurality of parallelly connected output networks each comprising a transformer-isolation resistance combination operably connected so that all of the output signals when taken from the secondary of each transformer will be isolated from all other outputs.

Figure 1:
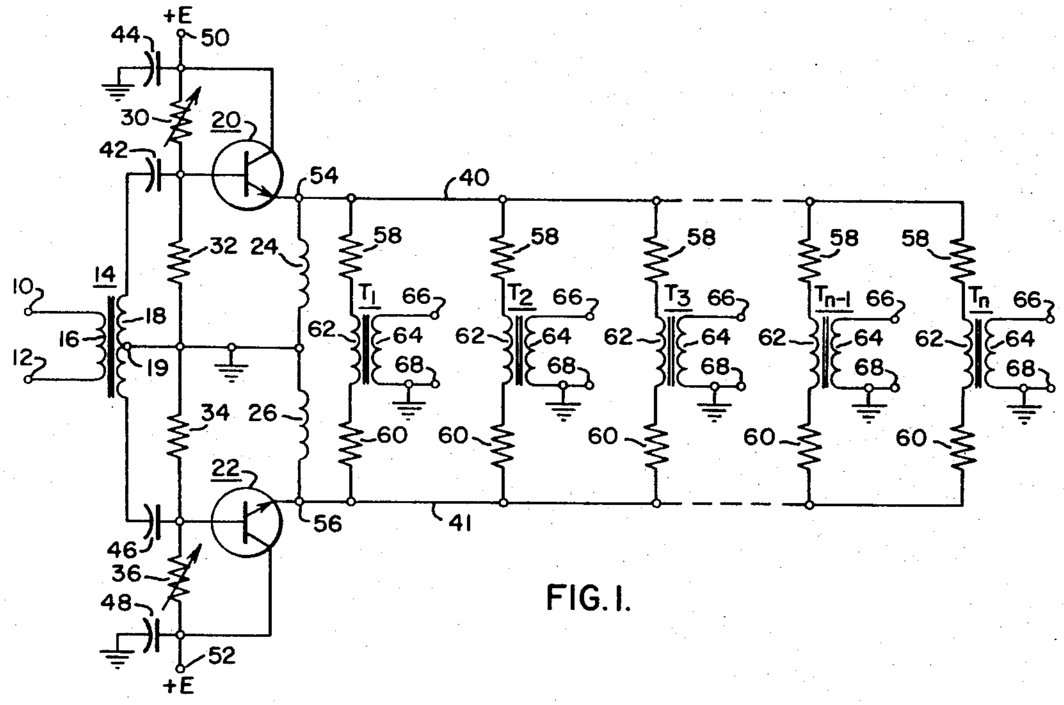

This invention relates to electrical apparatus for providing a plurality of output signals from a single signal source, and more particularly to a multi-output linear solid state isolator.

Apparatus for providing translation of electrical signals while maintaining a high degree of isolation between inputs and/or outputs is well known to those skilled in the art. The transformer hybrid network, which was developed in the telephony art, was one of the first instances where isolator networks were successfully utilized for providing isolated two-way signal transfer. Moreover, circuitry for providing a number of isolated outputs derived from one input is known to the applicants of the present invention. For example, U.S. Patent 3,109,998 for an "N Output Transmission Line and Transformer Hybrid," issued to George E. Petts III et al. discloses apparatus of this type as well as copending U.S. application, Ser. No. 219,067, filed Aug. 23, 1962, now Patent No. 3,192,490, for an "All Transformer Hybrid Network" filed in the name of George E. Petts III et al., and assigned to the assignee of the present invention. While each of these devices contributes marked advances to the state of the art, each has practical limitations such as substantial power loss, multiple adjustments, and in some cases high cost.

It is an object of the present invention therefore, to provide a simple, inexpensive means of achieving a high degree of isolation between a multiplicity of outputs derived from a single source of electrical energy.

It is another object of the present invention to provide a network utilizing solid state devices which provide a high degree of isolation between a multiplicity of outputs while maintaining a high degree of linearity.

It is yet another object of the present invention to provide a solid state multi-output divider type isolator network where the isolation and gain is substantially independent of loading.

It is still a further object of the present invention to provide an isolator device where no adjustment is required either during or after manufacture.

A still further object of the present invention is to provide an isolator network which provides substantially identical gain response to all outputs over a wide frequency range as well as providing substantially identical phase relationship between outputs.

Briefly, the subject invention comprises a push-pull transistor emitter follower circuit, driven from a single signal source, which feeds a plurality of output networks coupled in parallel to the emitter circuit of two or more transistors, with the output circuits each comprising a transformer and isolation resistance combination operably connected so that all of the output signals when taken from the secondary of each transformer will be isolated from all other outputs.

Figure 2:
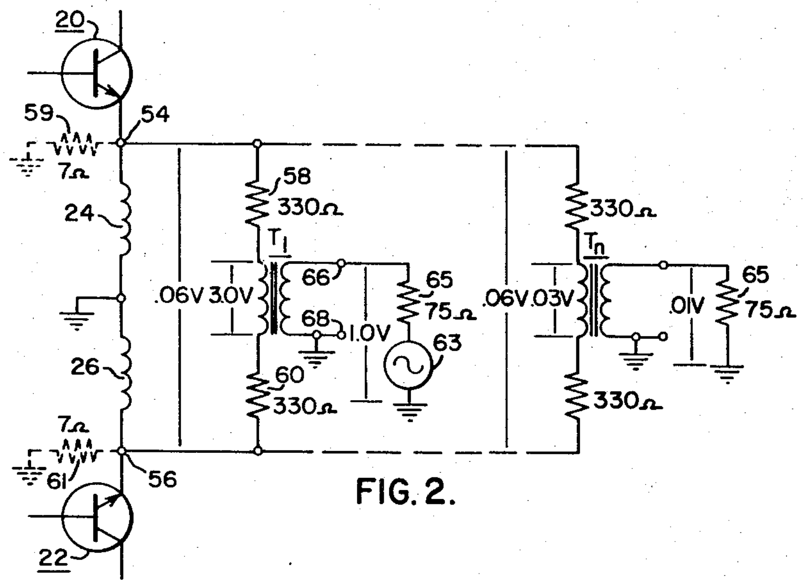

Other objects and advantages will become readily apparent as a study of the following detailed description proceeds when read in conjunction with the accompanying drawings in which:

FIGURE 1 is a schematic electrical diagram of the preferred embodiment of the subject invention; and FIG. 2 is a partial schematic diagram helpful in explaining the operation of the subject invention.

Medium power VHF transistors (5–10 watts), when used in an emitter follower configuration, exhibit a very low output impedance up to frequencies beyond 30 megacycles. In addition to a low output impedance, the emitter follower, when operated into a selected load, exhibts a high degree of linearity. The subject invention then contemplates utilizing the emitter follower in conjunction with a resistance-transformer network which provides a nearly ideal isolation network for use at frequencies from the extra low frequency band (ELF) through the high frequency band (HF) up to 30 megacycles.

Directing attention now to FIG. 1, there is shown a pair of input terminals 10 and 12 which are adapted to be coupled to a source of signal energy, not shown. Connected to the input terminals 10 and 12 is the primary winding 16 of input transformer 14. The input terminal 12, moreover, is shown connected to a point of common reference potential hereinafter referred to as "ground." The secondary winding 18 has one end coupled to the base electrode of transistor 20 by means of capacitor 42 while the other end thereof is connected to the base electrode of transistor 22 by means of capacitor 46. The center tap 19 of the secondary winding 18 is connected to ground. The emitter electrode of transistor 20 is returned to ground through an inductor 24 which is commonly referred to as an RF "choke" and has very little DC resistance. Likewise, the emitter electrode of transistor 22 is returned to ground through the choke 26. It should be pointed out that RF chokes 24 and 26 are preferably of the same type for providing symmetry and balance. A supply potential +E from a source, not shown, is adapted to be connected to terminals 50 and 52. The collector electrode of transistors 20 and 22 are adapted to be connected directly to terminals 50 and 52, respectively. A variable resistance 30 and fixed resistance 32 are connected between terminal 50 and ground and the common connection therebetween is directly connected to the base electrode of transistor 20. The purpose of these two resistances is to set the DC bias potential applied to the base electrode for proper operation of the transistor 20. In a like manner, variable resistance 36 and fixed resistance 34 is connected between terminal 52 and ground and has its common terminal directly connected to the base electrode of transistor 22 for the same reason; that is, proper biasing of transistor 22. Capacitors 44 and 48 are connected to terminals 50 and 52, respectively, for providing an RF bypass of signals so that they are prevented from being fed back into the supply source.

It should be pointed out that when a transistor is operated such that the signal is applied to the base electrode with a collector being connected directly to the supply source and taking the output signal from the emitter electrode, an emitter follower circuit is produced thereby. Also as in the present invention where the input signal is applied from opposite ends of a center tapped secondary transformer to two emitter follower circuits as shown in FIG. 1, a push-pull circuit is produced so that one emitter follower circuit operates on positive polarity signals applied to the input while the other emitter follower circuit operates on negative polarity signals.

A plurality of resistor-transformer output networks are coupled across intermediate terminals 54 and 56 which are common to the emitter electrodes of transistors 20 and 22, respectively. Each output network comprises a first resistor 58 and a second resistor 60 connected in series to the primary winding 62 of a respective transformer numbered $T_1$ to $T_n$ where $n$ is the desired number of output networks utilized. The secondary winding 64 of transformer $T_1$ to $T_n$ have output terminals 66 and 68 across which appears an output signal. Output terminal 68, moreover, is returned to ground. The resistors 58 and 60 of the $n$ number of output networks are selectively chosen in order to provide the necessary isolation so that isolation between any pair of output terminals 66 and 68 is obtained. Thus, when an input signal is applied across input terminals 10 and 12, it is simultaneously fed to all the output secondary windings of transformers $T_1$ to $T_n$.

That the various output signals of the $n$ outputs are isolated from one another can best be illustrated by a specific example. Directing attention to FIG. 2 are the transistors 20 and 22 coupled to the output networks 1 to $n$. Typical values for operation of the subject invention in the high frequency (HF) band between 2 and 30 megacycles (mc.) would be:

| | | |
|---|---|---|
| Transistors **20** and **22** | | 2N2876 |
| Resistors **58** and **60** | ohms | 330 |
| Transformer turns ratio ($N_p/N_s$) of $T_1$ to $T_n$ | | 3.1 |
| Load resistor **65** | ohms | 75 |

A signal source 63 is coupled to the secondary winding of $T_1$ through the output resistor 65. By adjusting the magnitude of the signal generated by the source 63 so that a 1.0 volt signal appears across terminals 66 and 68 of transformer $T_1$, the voltage will be stepped up so that 3.0 volts appears across the primary winding of $T_1$. Since the RF impedance of the RF chokes 24 and 26 is high, the impedance from terminal 54 to ground will be the output impedance of the transistor 20. Likewise, the impedance to ground of terminal 56 will be the output impedance of the transistor 22. Since the transistors 20 and 22 are operated in an emitter follower configuration, the output impedance is low, approximately 7 ohms at 30 megacycles. The equivalent 7 ohms output impedance of the emitter followers are illustrated as the dotted resistance followers are illustrated as the dotted resistances 59 and 61. By substituting the 7 ohms on each side of the 330 ohm isolation resistances 58 and 60, the voltage appearing across terminals 54 and 56 is calculated to be .06 volt. Accordingly, the .06 volt signal appears across the series combination of the two 330 ohm resistors 58 and 60 and the primary winding of transformer $T_n$ resulting in a voltage of .03 volt across the primary winding of $T_n$. Since it has been noted that the turns ratio is 3 to 1, the signal appearing across the secondary winding of transformer $T_n$ will be .01 volt. The ratio of the voltage appearing across the secondary winding $T_n$ to the voltage applied across the secondary winding $T_1$ is .01 to 1 or 40 decibels (db). This indicates that there is 40 db of isolation between the output terminals 66 and 68 of the secondaries of transformers $T_1$ and $T_n$. Moreover, utilizing substantially identical output stages, the isolation will be substantially identical between any pair of output terminals 66 and 68.

It should be pointed out that as the frequency of operation is reduced from 30 mc. the output impedance of the emitter followers, shown typically as 7 ohms, drops to the 2 to 3 ohm region so that isolation in excess of 50 db is achieved in the lower part of the HF band, i.e., 2 to 10 megacycles.

Because the output impedance of the emitter follower is low, that is, the resistance from terminal 54 or 56 to ground, isolation does not depend upon loading of other outputs. This can be demonstrated by assuming that there are 8 outputs ($n=8$) and applying a signal to one of the output stages for example $T_1$ such as shown in FIG. 2. The total loaded impedance of 7 outputs across terminals 54 and 56 is equal to $(660+675)/7=190$ ohms where 660 is equal to the series sum of the 330 ohm resistors and the 675 ohms is the reflected 75 ohm impedance of the 75 ohm impedance back to the primary winding of the respective transformers; since there are 7 stages connected in parallel, the total impedance is the total sum of the impedances divided by 7. However, this 190 ohms appears across a 14 ohm impedance, the impedance of the emitter followers. This makes the division of signal from any output to terminals 54 and 56 nearly constant regardless of the loading on the respective secondary windings of the transformers $T_1$ to $T_n$.

Due to the push-pull configuration shown in FIG. 1, a high degree of second order linearity is achieved. Second order products ($F1 \pm F2$) and third order products ($F1 \pm 2F2$), where F1 is any first frequency in the operating range and F2 is a second frequency in the operating range different from F1, have been measured experimentally in the high frequency band (2 to 30 megacycles) in excess of 80 db down relative to 1 volt signals.

The subject invention is not limited to a specific number of outputs. The emitter follower configuration maintains nearly a constant output voltage over a wide range of loading, hence more or less outputs may be used with very little change in gain. The only parameter which is effected is intermodulation. That is, F1±F2, FI±2F2, etc. As the number of outputs increase, the intermodulation effect is noticed more than relatively fewer outputs.

In general, the subject invention overcomes substantially all of the disadvantages of the prior art teaching multi-output isolation and is adapted to be utilized in a wide variety of applications, where multi-outputs are required. When desirable, electron tubes can be substituted for the transistors 22 and 20 so that a push-pull cathode follower circuit is used to drive the $n$ output circuits; however, the amount of isolation is reduced thereby, e.g., a reduction of 40 db isolation to 30 db due to the fact that cathode follower output impedances are generally much higher than the emitter follower.

While there has been shown and described what is at present considered to be the preferred embodiment of the subject invention, modifications thereto will readily occur to those skilled in the art. It is not desired, therefore, that the invention be limited to the specific arrangements shown and described, but it is to be understood that all equivalents, alterations, and modifications within the spirit and scope of the invention are herein meant to be included.

We claim as our invention:

1. A solid state isolator network for providing a plurality of output signals from a single signal source, comprising in combination: a first and a second transistor emitter follower circuit coupled together in push-pull circuit relationship, said first and said second emitter follower circuit each having a base input circuit and an emitter output circuit; input means for coupling said single signal source to said base input circuit of said first and said second emitter follower circuit; and a plurality of output circuits coupled in parallel circuit combination across said emitter output circuit of said first and said second emitter follower circuit connected in push-pull circuit combination, said plurality of output circuits each comprising a transformer having a primary and a secondary winding and resistance means coupled in series with said primary winding across said emitter output circuits for providing an isolated output signal across each said secondary winding.

2. Apparatus as claimed in claim 1 wherein said input means comprises a transformer having a primary and a secondary winding with said secondary winding being coupled to said base input circuit of said first and said secondary emitter follower circuit.

3. A multi-output linear solid state isolator network for providing a plurality of output signals from a single input signal source, comprising in combination: input means adapted to be connected to said single input signal source; a first and a second transistor connected to said input means in an emitter follower configuration and in push-pull relationship to each other; and a plurality of isolated output circuits coupled in parallel to said emitter follower configuration, said plurality of isolated output circuits each comprising a transformer having a primary and a secondary winding, a first resistor connected to one end of said primary winding, a second resistor connected to the other end of said primary winding providing a series circuit combination thereby, said series circuit combination being connected to said emitter follower configuration, said first and said second resistor providing the necessary isolation for providing an isolated output signal across said secondary winding which is isolated from all other of said plurality of output circuits.

4. A multi-output linear solid state isolator adapted to be operated from a source of supply potential and supplied an input signal from a signal source, comprising in combination: a first and a second transistor each having a base, an emitter, and a collector; circuit means for coupling said supply source to said base and said collector of said first and said second transistors; input means for coupling said signal source to said base of said first and said second transistor; impedance means connected between the emitter of both transistors and a point of reference for defining emitter follower circuits; circuit means for connecting said first and said second transistor in a push-pull emitter follower configuration; a first terminal connected to said emitter of said first transistor; a second terminal connected to said emitter of said second transistor; and a plurality of isolated output circuits coupled in parallel across said first and said second terminal, each said plurality of output circuits comprising a transformer having a primary and a secondary winding, and resistance means connected in series circuit combination with said primary winding to said first and said second terminal so that an isolated output signal with respect to all other output circuits appears across said secondary winding.

5. A solid state isolator as defined in claim 4 where said input means comprises a transformer having a primary and a secondary winding, including means for connecting said primary winding to said signal source and including circuit means for connecting said secondary winding to said base of said first and said second transistor.

6. A multi-output linear solid state isolator network for providing a plurality of isolated output signals from a single signal source and adapted to be powered from a source of supply voltage, comprising in combination: an input transformer having a primary and a secondary winding, said primary winding being adapted to be coupled to said source; a first and a second transistor, each having a base circuit, an emitter circuit and a collector circuit; means for connecting one end of said secondary winding of said input transformer to said base circuit of said first transistor; means for coupling the other end of said secondary winding of said input transformer to said base circuit of said second transistor; circuit means for coupling said collector circuit of said first and second transistors directly to said supply voltage; resistance means connecting said base circuit of said first and said second transistor to said supply voltage for providing DC bias thereto; impedance means coupled to said emitter circuit of said first and said second transistor and having a common connection coupled back to said secondary winding of said input transformer for providing a push-pull emitter follower circuit thereby; and a plurality of isolated output circuits coupled in parallel circuit combination across said impedance means connected to said emitter circuits of said first and said second transistor, said plurality of isolated circuits each comprising a transformer having a primary and a secondary winding, a first resistor connected to one end of said primary winding, and a second resistor connected to the other side of said primary winding providing a series circuit combination thereby, said series circuit combination being coupled across said impedance means, said first and said second resistor providing necessary isolation so that an isolated output signal appears across each said secondary winding.

References Cited

Crowhurst, "High Power for the Twin-Coupled Amplifier," Radio Electronics, October 1960, pp. 34–38, and 330–118.

ROY LAKE, *Primary Examiner.*

J. B. MULLINS, *Assistant Examiner.*